United States Patent
Hashimoto et al.

(10) Patent No.: US 6,380,497 B1
(45) Date of Patent: Apr. 30, 2002

(54) HIGH STRENGTH TOUCH PANEL AND METHOD OF MANUFACTURING THE SAME

(75) Inventors: Takao Hashimoto; Yasuji Kusuda, both of Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 09/529,060

(22) PCT Filed: Oct. 9, 1998

(86) PCT No.: PCT/JP98/04558

§ 371 Date: Apr. 7, 2000

§ 102(e) Date: Apr. 7, 2000

(87) PCT Pub. No.: WO99/19893

PCT Pub. Date: Apr. 22, 1999

(30) Foreign Application Priority Data

Oct. 9, 1997 (JP) ............................................. 9-293278

(51) Int. Cl.[7] ............................................. H01H 13/70
(52) U.S. Cl. ........................ 200/5 A; 200/600; 200/512; 29/622; 345/173
(58) Field of Search ............................ 29/622; 200/5 A, 200/600, 512; 338/13, 47, 99, 114; 345/156, 173, 174

(56) References Cited

U.S. PATENT DOCUMENTS

| | | | |
|---|---|---|---|
| 4,083,100 A | 4/1978 | Flint et al. | ..................... 29/622 |
| 4,417,105 A | * 11/1983 | Glaser, Jr. | ..................... 200/5 A |
| 4,672,153 A | * 6/1987 | Kikuchi | ........................ 178/18 |
| 5,062,198 A | * 11/1991 | Sun | .............................. 29/622 |
| 5,668,576 A | * 9/1997 | Ikura et al. | ................... 345/173 |
| 5,844,175 A | * 12/1998 | Nakanishi et al. | ........ 178/18.03 |
| 5,869,791 A | * 2/1999 | Young | ..................... 178/20.01 |

FOREIGN PATENT DOCUMENTS

| | | | | |
|---|---|---|---|---|
| JP | 60-9129 | 1/1985 | .......... | H01H/13/70 |
| JP | 61-47026 | 3/1986 | .......... | H01H/11/00 |
| JP | 4-366513 | 12/1992 | .......... | H01H/11/00 |

* cited by examiner

*Primary Examiner*—Michael Friedhofer
(74) *Attorney, Agent, or Firm*—Wenderoth, Lind & Ponack, L.L.P.

(57) ABSTRACT

In a resistance film type touch panel (8), an upper electrode sheet (1) having upper electrodes (111) on one face of a flexible transparent film (9) and a hard coat layer (12) on the other face of the film, and a lower electrode sheet (2) having lower electrodes (121) confronting the upper electrodes on one face of a glass substrate (10) are arranged to face each other over a distance maintained by spacers (13) between the upper electrodes and the lower electrodes. Respective peripheries of the upper electrodes and the lower electrodes confronting the upper electrodes are bonded by an adhesive layer (3), with the transparent film and the hard coat layer being fused at respective end parts thereby constituting a compressive stress layer (10*a*) at a surface layer part of each side end face of the glass substrate.

9 Claims, 6 Drawing Sheets

Fig. 11

HIGH STRENGTH TOUCH PANEL AND METHOD OF MANUFACTURING THE SAME

TECHNICAL FIELD

The present invention relates to high-strength touch panels disposed on screens of LCDs (liquid crystal displays), CRTs (cathode ray tubes), etc. which provide for positional input when pressed from above by a finger, a pen, or the like in accordance with instructions seen through the screen, and a method for producing the same.

BACKGROUND ART

There has conventionally been used a touch panel of a resistance film type, which comprises an upper electrode sheet having electrodes and a hard coat layer at opposite faces of a flexible transparent film, and a lower electrode sheet having electrodes at one face of a glass substrate and opposed to the upper electrode sheet via spacers, with peripheral edge parts bonded by an adhesive sheet. In a method of manufacturing the touch panel, generally, the upper electrode sheet and lower electrode sheet, both of a large size to provide for many electrodes, are formed and bonded to each other, and then notches are formed from the side of the upper electrode sheet with the use of a cutter such as a metallic blade, whereby the upper electrode sheet is cut for separation of the electrodes. At the same time, the bonded body is notched with the use of a cutter from the side of the lower electrode sheet, whereby grooves are formed in the glass substrate of the lower electrode sheet for separation of the electrodes. When the lower electrode sheet is separated along the grooves of the glass substrate, the bonded body is divided to obtain individual touch panels.

Typically these days, the touch panel becomes loaded on displays of portable information terminals. Although this raises a question of the strength of glass of the touch panel when subjected to impact, for instance, when the touch panel is dropped, the touch panel manufactured in the conventional method is lacks sufficient strength.

The hard coat layer at the uppermost part of the upper electrode sheet in the prior art is intended to improve the sliding property at an input face of the touch panel and prevent flaws, but is nevertheless flaked off from both sides of cutting lines of the upper electrode sheet when the upper electrode sheet is cut with a cutter such as a metallic blade.

Further, in the conventional technique, cutting is formed with the use of the cutter from both faces, i.e., the upper electrode sheet and lower electrode sheet. In other words, alignment between the cutting lines of the upper electrode sheet and the grooves formed in the glass substrate of the lower electrode sheet is an important factor. However, the alignment therebetween is difficult to achieve because the cutting lines as well as the grooves are formed by the cutter such as the metallic blade or the like in a breadth of smaller than 0.1 mm.

For solving this issue of alignment, instead of notching from the lower electrode sheet, notches might be formed only from the upper electrode sheet by the cutter, thereby cutting the upper electrode sheet and at the same time grooving the glass substrate of the lower electrode sheet. In comparing this method with the technique whereby the grooves are formed in a separate process in the glass substrate, the glass substrate is hard to cut sharp, and it is highly probable that microcracks will occur at the grooves. The glass substrate will be broken from an end face in a glass strength test and deteriorated greatly in strength. The method is therefore not practical.

The present invention has for its object to solve the issue and provide a touch panel including glass of superior strength and a hard coat layer of superior adhesion and a method for producing the same which facilitates or eliminates alignment in a production process between cutting lines of an upper electrode sheet and grooves of a glass substrate of a lower electrode sheet.

SUMMARY OF THE INVENTION

In accomplishing this object of the present invention, the present invention is constructed as follows.

According to a first aspect of the present invention, there is provided a resistance film type touch panel in which an upper electrode sheet having upper electrodes at one face of a flexible transparent film and a hard coat layer at the other face of the film, and a lower electrode sheet having lower electrodes confronting the upper electrodes at one face of a glass substrate are disposed to face each other over a distance maintained by spacers between each upper electrode and each lower electrode confronting the upper electrode and bonded at respective peripheries by an adhesive layer, wherein the transparent film and the hard coat layer are fused at side end parts thereby forming fused parts, so that a surface layer part of each side end face of the glass substrate adjacent to the fused part becomes a compressive stress layer.

According to a second aspect of the present invention, there is provided a method for producing resistance film type high strength touch panels, in which an upper electrode sheet having a plurality of upper electrodes at one face of a flexible transparent film and a hard coat layer at the other face of the film, and a lower electrode sheet having a plurality of lower electrodes confronting the plurality of upper electrodes at one face of a glass substrate are disposed to face each other over a distance maintained by spacers between each upper electrode and each lower electrode confronting the upper electrode and bonded at respective peripheries by an adhesive layer, and the combination is then divided into individual touch panels. The method comprises:

bonding the upper electrode sheet having the plurality of upper electrodes and the lower electrode sheet having the plurality of lower electrodes by means of the adhesive layer;

thereafter projecting a laser light beam from a side of the upper electrode sheet thereby cutting the upper electrode sheet for each of the upper electrodes, while notching from a side of the lower electrode sheet with use of a cutter thereby forming first grooves in the glass substrate of the lower electrode sheet for each of the lower electrodes; and thereafter dividing the glass substrate along the first grooves of the glass substrate to obtain individual touch panels.

According to a third aspect of the present invention, there is provided the method for producing resistance film type high-strength touch panels according to the second aspect, the method including:

forming second grooves in the glass substrate of the lower electrode sheet under the upper electrode sheet for every lower electrode concurrently by the projection of the laser light beam when the upper electrode sheet is cut for each upper electrode by the projection of the laser light beam from the side of the upper electrode sheet; and dividing the glass substrate along the first and second grooves at both faces of the glass plate when the glass plate is divided along the first grooves, thereby obtaining individual touch panels.

According to a fourth aspect of the present invention, there is provided a method for producing resistance film type high-strength touch panels, in which an upper electrode sheet having a plurality of upper electrodes at one face of a flexible transparent film and a hard coat layer at the other face of the film, and a lower electrode sheet having a plurality of lower electrodes confronting the plurality of upper electrodes at one face of a glass substrate are disposed to face each other over a distance maintained by spacers between each upper electrode and each lower electrode confronting the upper electrode and bonded at respective peripheries by an adhesive layer, and the combination which is then divided into individual touch panels. The method includes:

bonding the upper electrode sheet having the plurality of upper electrodes and the lower electrode sheet having the plurality of lower electrodes by means of the adhesive layer;

thereafter projecting a laser light beam from a side of the upper electrode sheet thereby cutting the upper electrode sheet for each upper electrode and forming grooves for each lower electrode in the glass substrate of the lower electrode sheet under the upper electrode sheet; and thereafter dividing the glass substrate along the grooves for each electrode to obtain individual touch panels.

According to a fifth aspect of the present invention, there is provided a method for producing resistance film type high strength touch panels in which an upper electrode sheet having a plurality of upper electrodes at one face of a flexible transparent film and a hard coat layer at the other face of the film, and a lower electrode sheet having a plurality of lower electrodes confronting the plurality of upper electrodes at- one face of a glass substrate are disposed to face each other over a distance maintained by spacers between each upper electrode and each lower electrode confronting the upper electrode and bonded at respective peripheries by an adhesive layer, and the combination is then divided into individual touch panels. The method includes:

bonding the upper electrode sheet having the plurality of upper electrodes and the lower electrode sheet having the plurality of lower electrodes by means of the adhesive layer; and thereafter projecting a laser light beam from a side of the upper electrode sheet thereby cutting the upper electrode sheet for each of the upper electrodes and cutting the lower electrode sheet under the upper electrode sheet for each of the lower electrodes, thereby obtaining individual touch panels.

According to a sixth aspect of the present invention, there is provided a method for producing resistance film type high-strength touch panels according to any one of the second through fifth aspects, wherein the transparent film and the hard coat layer are fused at side end parts thereby forming fused parts at the projection of the laser light beam, so that a surface layer part of each side end face of the glass substrate adjacent to the fused part becomes a compressive stress layer.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

A touch panel according to one embodiment of the present invention and a production method therefor will be described in detail with reference to the drawings.

Figure 8:
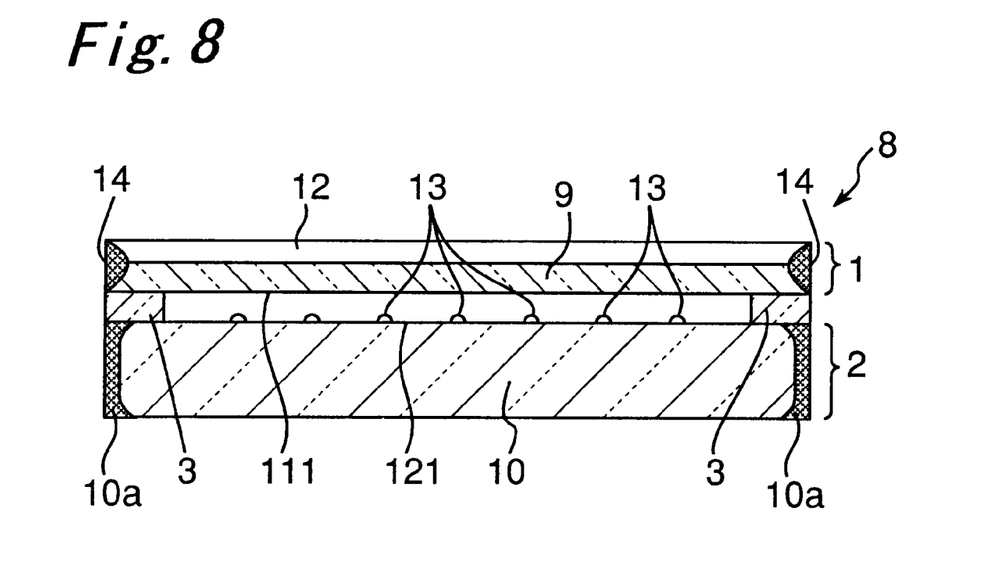
FIG. 8 is a schematic diagram of the high-strength touch panel in the first embodiment of the present invention.
Figure 9:
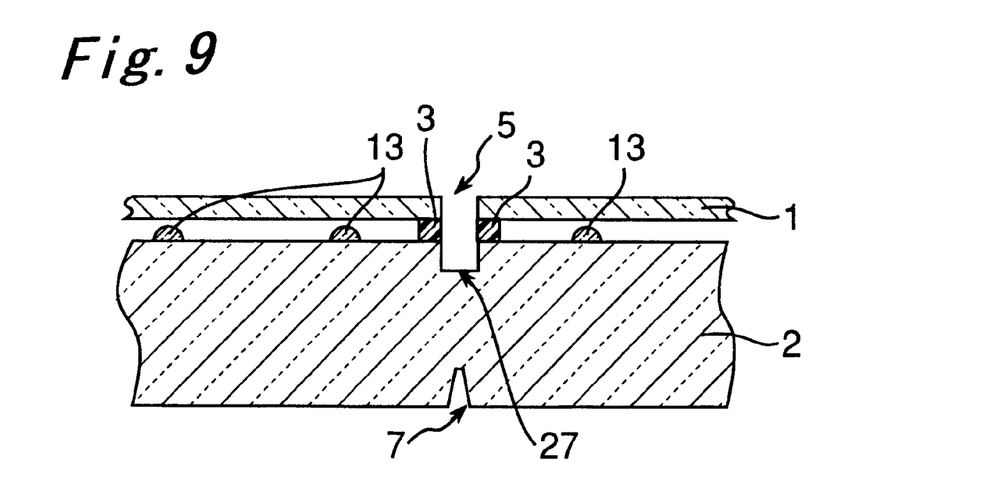
FIG. 9 is a partial sectional view showing a groove of the lower electrode sheet formed by projection of a laser light beam in a production method for a high-strength touch panel according to a second embodiment of the present invention.
Figure 10:
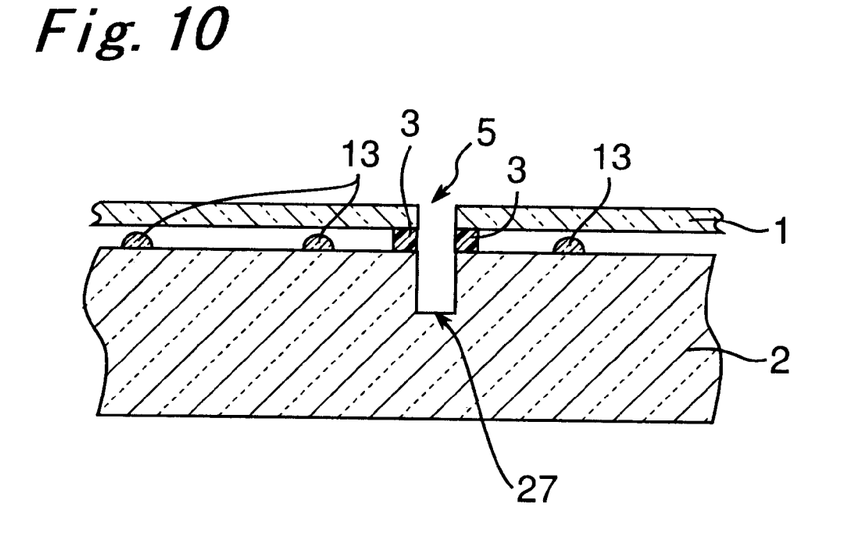
FIG. 10 is a partial sectional view showing a groove of the lower electrode sheet formed by projection of a laser light beam in a production method for a high-strength touch panel according to a third embodiment of the present invention.
Figure 11:
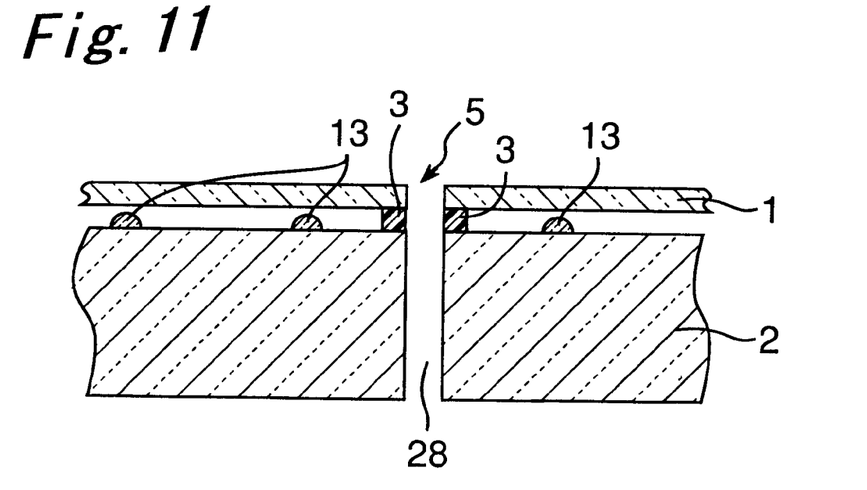
FIG. 11 is a partial sectional view showing a cutting line of the lower electrode sheet formed by projection of laser light beam in a production method for a high-strength touch panel according to a fourth embodiment of the present invention.

FIGS. 1, 2, 4, 6, and 7 are schematic diagrams showing a production process of a high-strength touch panel according to a first embodiment of the present invention. FIG. 3 is a partial sectional view of a cutting line of an upper electrode sheet 1 formed by projection of a laser light beam 4 in a production method for the high-strength touch panel according to the first embodiment of the present invention. FIG. 5 is a partial sectional view of a groove 7 of a lower electrode sheet 2 formed by notching with the use of a cutter 6 in the production method for the high-strength touch panel in the first embodiment of the present invention. FIG. 8 is a schematic diagram of the high-strength touch panel of the first embodiment of the present invention. FIGS. 9 and 10 are partial sectional views of grooves 27 of the lower electrode sheets 2 formed by projection of the laser light beams 4 in production methods for the high-strength touch panels according to second and third embodiments of the present invention. FIG. 11 is a partial sectional view of a cutting line 28 of the lower electrode sheet 2 formed by projection of a laser light beam 4 in a production method for a high-strength touch panel according to a fourth embodiment of the present invention.

In the drawings, 1 is a rectangular upper electrode sheet having a plurality of upper electrodes 111 and a plurality of auxiliary electrodes 22 for power supply to lower electrodes. 2 is a rectangular lower electrode sheet having a plurality of lower electrodes 121. 3 is a rectangular adhesive sheet by way of example of an adhesive layer which includes four rectangular openings 3a respectively corresponding to four high-strength touch panels to be produced, and connection through-holes 3b where a conductive adhesive for electrically connecting the auxiliary electrodes 22 of the upper electrode sheet 1 with end parts of the rectangular lower electrodes 121 of the lower electrode sheet 2 is arranged. 4 is a laser light beam, and 5 is a cutting line formed by the laser light beam 4 in the upper electrode sheet 1. 6 is a cutter. 7 is a groove 7 formed by the cutter 6. 8 is a touch panel. 9 is a transparent film. 10 is a rectangular transparent glass substrate. 10a is a compressive stress layer. 12 is a hard coat layer. 13 is a transparent insulating spacer formed at many points at the lower electrodes 121. 14 is a fused part.

According to the first embodiment of the present invention, the rectangular upper electrode sheet 1 is constructed as follows. The rectangular upper electrode sheet 1 has on one face of the flexible transparent film 9 four rectangular upper electrodes 111, each constituted of a transparent conductive film 11a, corresponding to four high-strength touch panels, the plurality of auxiliary electrodes 22 for power supply to the lower electrodes, etc. The hard coat layer 12 is provided at the whole other face of the transparent film 9. The rectangular lower electrode sheet 2 is constructed so that the rectangular lower electrode sheet 2 has four rectangular lower electrodes 121 set to corresponding to the four high-strength touch panels and also to corresponding to the above upper electrodes 111 at one face of the rectangular glass substrate 10. Each of the lower electrodes 121 is an area necessary for input among a transparent conductive film 21a formed at the entire face of the glass substrate 10.

Each of the upper electrodes 111 of the upper electrode sheet 1 and each of the lower electrodes 121 of the lower electrode sheet 2 face each other over a distance maintained by many dot-shaped spacers 13. In this state, each upper electrode 111 of the upper electrode sheet 1 and each lower electrode 121 of the lower electrode sheet 2 are bonded to each other at the peripheries by the adhesive sheet 3 to produce four resistance film type touch panels. On bonding the upper electrode sheet 1 with the lower electrode sheet 2 by the adhesive sheet 3, each auxiliary electrode 22 of the upper electrode sheet 1 is electrically connected with each terminal part of the lower electrodes 121 of the lower electrode sheet 2 via the conductive adhesive in each of the through-holes 3b of the adhesive sheet 3, so that electricity can be supplied from each of the auxiliary electrodes 22 of the upper electrode sheet 1 to each of the lower electrodes 121 of the lower electrode sheet 2. The four touch panels produced simultaneously in a state in which the four touch panels are coupled with each other are separated at the end to obtain individual touch panels.

The thus-manufactured touch panel of a resistance film type is disposed on screens of LCDs (liquid crystal display), CRTs (cathode ray tube), and the like. When the touch panel is pressed from above by a finger, a pen, or the like in accordance with an instruction on the screen such as the LCD seen through the touch panel, the upper electrodes 111 of the upper electrode sheet 1 and lower electrodes 121 of the lower electrode sheet 2 opposed to each other at intervals formed by the many dot spacers 13 are brought into contact with each other, thereby achieving position input.

The production method for the above touch panel of a resistance film type will be more fully described hereinbelow.

Figure 1:
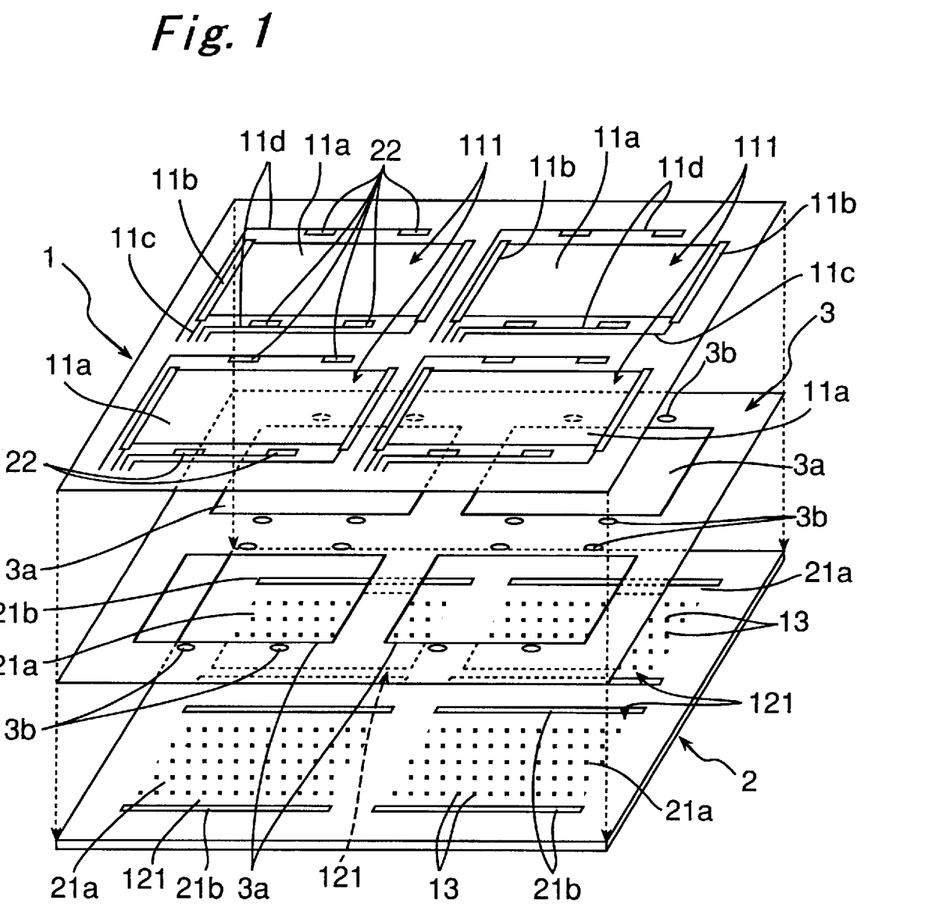
FIG. 1 is a schematic diagram of a production process of a high-strength touch panel according to a first embodiment of the present invention.

The large rectangular upper electrode sheet 1 where many upper electrodes 111, e.g., four electrodes in FIG. 1, will be formed and the large rectangular lower electrode sheet 2 where many lower electrodes 121, for instance, four lower electrodes in FIG. 1, will be formed are bonded by the adhesive sheet 3 (referring to FIG. 1). In this state, as described above, each upper electrode 111 of the upper electrode sheet 1 and each lower electrode 121 of the lower electrode sheet 2 face each other via the distance of the dot spacers 13, and at the same time, the auxiliary electrodes 22, for supplying power to the lower electrodes, of the upper electrode sheet 1 are electrically connected to end parts of the lower electrodes 121 of the lower electrode sheet 2 via the conductive adhesive in the respective through-holes 3b of the adhesive sheet 3.

Figure 2:
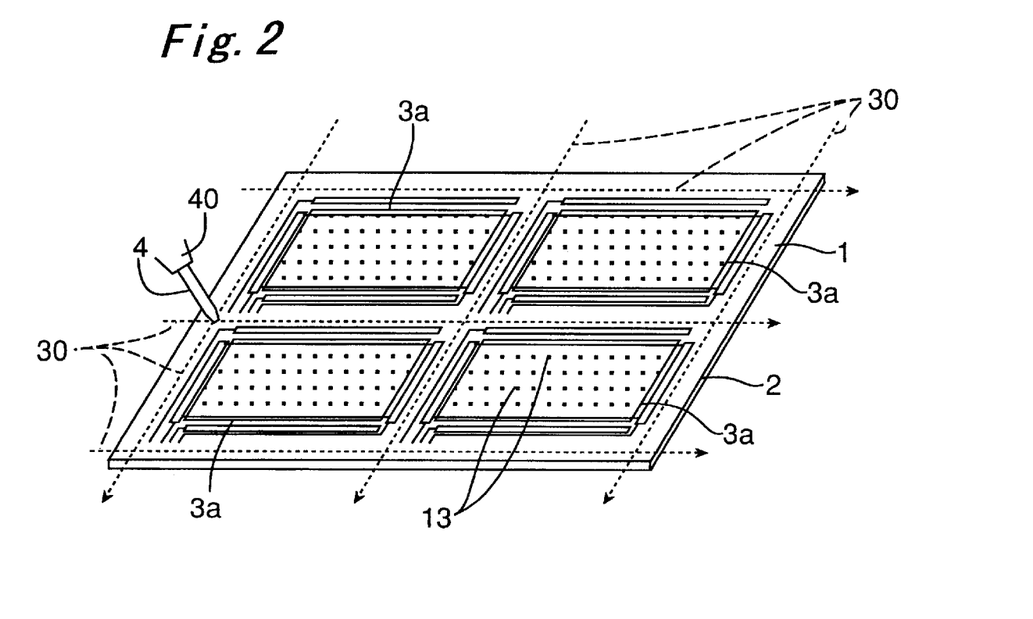
FIG. 2 is a schematic diagram of the production process of the high-strength touch panel in the first embodiment of the present invention.
Figure 3:
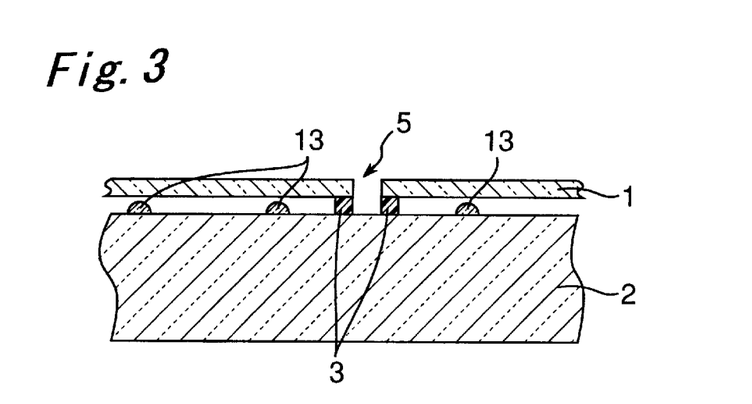
FIG. 3 is a partial sectional view showing a cutting line of an upper electrode sheet formed by the projection of laser light beams in a production method for the high-strength touch panel in the first embodiment of the present invention.

Thereafter, the laser light beam 4 is projected from the side of the upper electrode sheet 1 along cutting plan lines 30 shown in FIG. 2 (referring to FIG. 2), thereby cutting the upper electrode sheet 1 into upper electrodes 111 (referring to FIG. 3). An alignment mark is formed beforehand on the glass substrate 10 by printing or the like, and the alignment mark is read optically by a recognition camera. The cutting plan lines 30 along which the upper electrode sheet 1 is to be cut are determined on coordinates set on the basis of the read alignment mark. A projection nozzle 40 projecting the laser light beam 4 is moved to trace the cutting plan lines 30.

Figure 4:
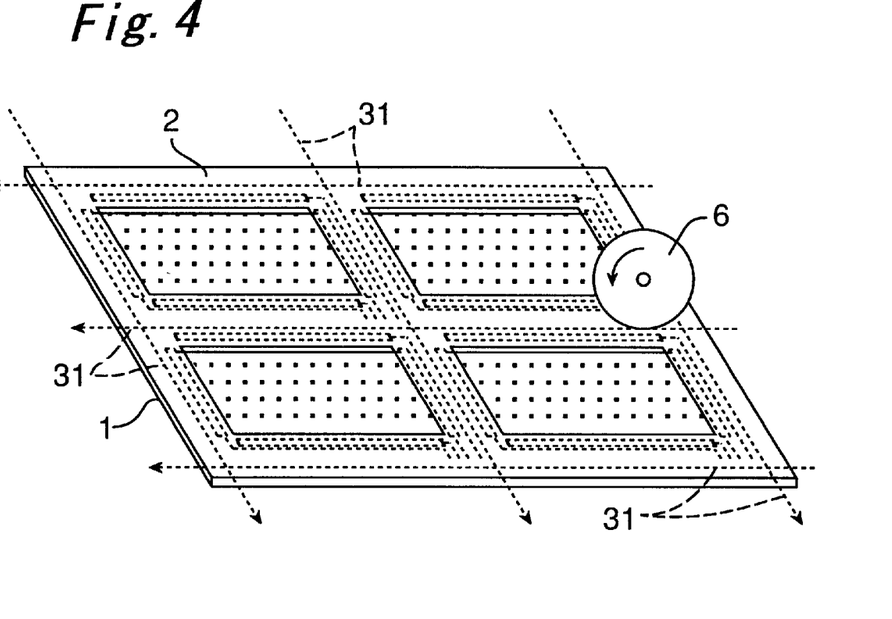
FIG. 4 is a schematic diagram of the production process of the high-strength touch panel in the first embodiment of the present invention.
Figure 5:
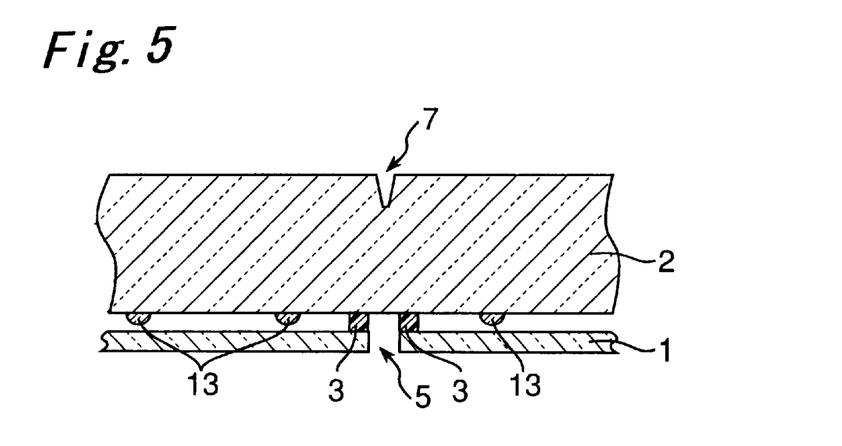
FIG. 5 is a partial sectional view showing a groove of a lower electrode sheet formed by notching with the use of a cutter in the production method for the high-strength touch panel in the first embodiment of the present invention.

Thereafter, the lower electrode sheet 2 is notched from the side of the lower electrode sheet 2 with the use of the cutter 6 along the cutting lines where the upper electrode sheet 1 is cut by projection of the laser light beam 4 (referring to FIG. 4). As a result, grooves 7 are formed for every lower electrode 121 in the glass substrate 10 of the lower electrode sheet 2 (referring to FIG. 5). The alignment mark on the glass substrate 10 is read from the side of the lower electrode sheet 2 and coordinates are determined on the basis of the read alignment mark. Notching plan lines 31 are determined on the coordinates to agree with positions of the cutting plan lines 30 along which the cutting has been done. The grooves 7 are formed by notching along the notching plan lines with the cutter 6. Each groove 7 can thus be positioned within the breadth of the corresponding cutting line of the upper electrode sheet 1 which has been cut by the projection of the laser light beam 4. In this case, the groove 7 is not necessarily formed in a continuous line, but can be a chain line so long as the glass substrate 10 is made divisible.

Figure 6:
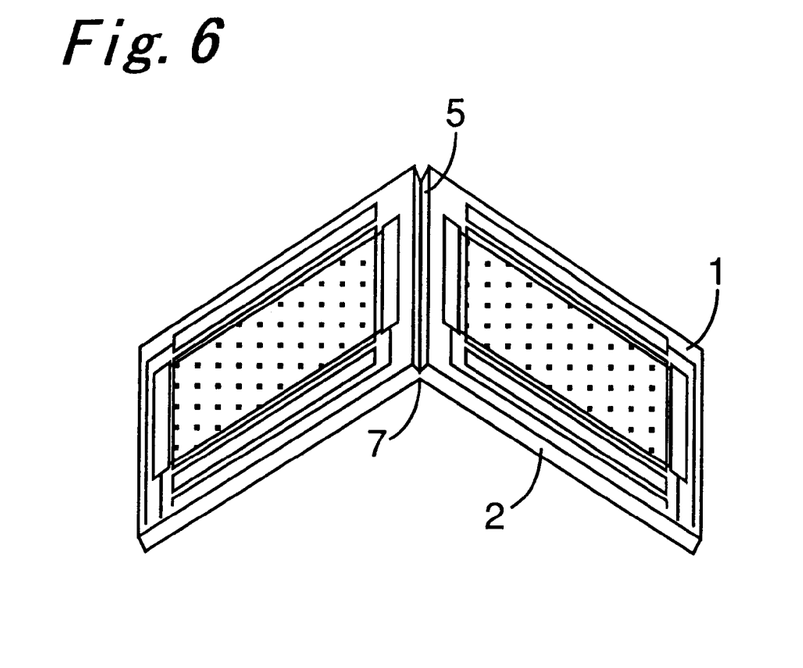
FIG. 6 is a schematic diagram of the production process of the high-strength touch panel in the first embodiment of the present invention.
Figure 7:
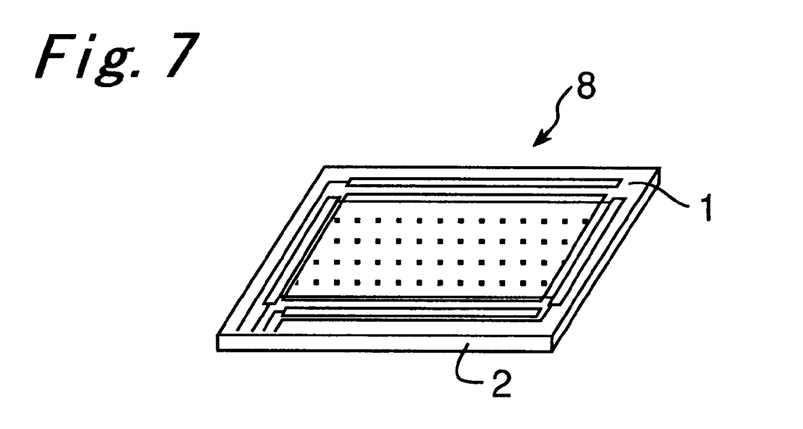
FIG. 7 is a schematic diagram of the production process of the high-strength touch panel in the first embodiment of the present invention.

Thereafter, the glass substrate 10 is finally separated in, for example, two in its longitudinal direction along the groove 7 of the glass substrate 10 by hands or the like, then separated in two in its breadthwise direction, whereby the glass substrate 10 is divided in four pieces (referring to FIG. 6). Individual touch panels 8 are obtained in this manner (referring to FIG. 7).

At the time when the laser light beam 4 is projected to the upper electrode sheet 1 of each touch panel 8 obtained in this manner, the transparent film 9 and the hard coat layer 12 constituting the upper electrode sheet 1 are fused at four side end parts, thereby forming fused parts 14 at each touch panel 8. Moreover, a surface layer part of each of four side end faces of the glass substrate 10 below the fused parts 14 is turned into a compressive stress layer 10a (referring to FIG. 8).

The transparent film 9 of the upper electrode sheet 1 is formed of: engineering plastic such as polycarbonate, polyamide, polyolefin, polyether ketone; acryl; polyethylene terephthalate; polybutylene terephthalate; etc. The transparent film 9 may be a layered body of a plurality of film layers, instead of a single-layer film.

The glass substrate 10 of the lower elect-rode sheet 2 is a sheet of soda-lime glass or borosilicate glass, etc.

In addition to the upper electrodes 111 and the lower electrodes 121, transparent conductive films, a pair of parallel bus bars, leaded line circuits, and the like are formed at opposite faces of the upper electrode sheet 1 and the lower electrode sheet 2. The transparent conductive film is a film of metal oxide, for example, tin oxide, indium oxide, antimony oxide, zinc oxide, cadmium oxide, or indium tin oxide (ITO), a composite film essentially consisting of the above metal oxide, or a metallic film of gold, silver, copper, tin, nickel, aluminum, palladium, or the like. The transparent conductive film may be constituted of many layers. The bus bars and the leaded line circuits are formed of a conductive paste of metal such as gold, silver, copper, nickel, or the like, or carbon or the like. In many cases, the leaded line circuits may be formed all together on either the upper electrode sheet 1 or the lower electrode sheet 2. For the example, in FIG. 1, the transparent conductive film 11a of the upper electrode sheet 1 is formed only between the bus bars 11b and, the leaded line circuit 11c is formed all together on a part of the upper electrode sheet 1 where the conductive transparent film 11a is not formed. The bus bars 11b formed on the upper electrode sheet 1 are directly electrically connected to the leaded line circuits 11c on the same sheet. Bus bars 21b formed on the lower electrode sheet 2 are electrically connected via the conductive adhesive in the through holes 3b of the adhesive sheet 3 to leaded line circuits 11d on the upper electrode sheet 1 having the auxiliary electrodes 22 for supplying power to the lower electrode. The arrangement of the leaded line circuits is not limited to this, and the leaded line circuits can be formed all together on the lower electrode sheet 2 or separately formed on the upper electrode sheet 1 and the lower electrode sheet 2.

The hard coat layer 12 is formed at a face of the transparent film 9 opposite the face thereof where the upper electrodes 111 are formed of an organic material, e.g., thermoset resin such as acryl epoxy or urethane, or acrylate photoset resin, etc. The hard coat layer 12 may be subjected to non-glare treatment to irregularly reflect light by turning a surface of the hard coat rough with fine particles. For example, a surface of the hard coat layer 12 is processed to be bumpy, or an extender pigment, silica or alumina fine particles are mixed in the hard coat layer 12, or the like treatment is possible.

The spacers 13 are formed at surfaces of either the transparent conductive films 11a of the upper electrode sheet 1 or the transparent conductive films 21a of the lower electrode sheet 2. In FIG. 1, the spacers 13 are formed on the surface of the transparent conductive film 21a of the lower electrode sheet 2. The spacers 13 may be obtained by forming fine dots in a photographic process using a transparent photoset resin, e.g., acrylate resin such as melamine acrylate resin, urethane acrylate resin, epoxy acrylate resin, methacryl acrylate resin, or acryl acrylate resin; or polyvinyl alcohol resin, etc. Many fine dots may be formed alternatively by a printing method to obtain the spacers 13.

A double-faced adhesive sheet is generally used as the adhesive sheet 3 from which a part corresponding to a visible area of the panel and a part corresponding to application parts of the conductive adhesive at the leaded line circuits are punched as a rectangular opening and through holes 3b. An adhesive, e.g., water or acrylic printing adhesive can replace the double-faced adhesive sheet.

In cutting the upper electrode sheet 1 through the projection of the laser light beam 4, a breadth of the laser light beam 4, namely, a spot diameter of the projected laser light beam is kept constant at a projection face on the upper electrode sheet 1 while the projection nozzle 40 is moved linearly. An area, of upper electrode sheet 1, having a breadth equal to the projected spot diameter of the laser light beam 4 and a length equal to a movement distance of the projection nozzle 40 is burnt off. The breadth of the laser light beam 4 can be controlled by condensing the laser light beam 4 by a laser beam projection lens and focusing the condensed laser light beam. The size of the breadth of the burnt-off laser light beam projection area may be set to enable the alignment between the cutting lines 5 of the upper electrode sheet 1 and the grooves 7 when the grooves 7 are formed in the glass substrate 10 from the side of the lower electrode sheet 2 (referring to FIG. 5). Preferably, the breadth of the burnt-off area is generally 0.1–0.5 mm as the optimum range.

In consequence of burning off the part to be cut of the upper electrode sheet 1 by the projection of the laser light beam 4, the transparent film 9 and the hard coat layer 12 on the transparent film 9 are melted at respective cut end parts and fused to each other, thereby constituting the fused parts 14. Accordingly, the transparent film 9 and the hard coat layer 12 show strong adhesion at the fused parts 14 (referring to FIG. 8).

Moreover, the projection of the laser light beam 4 to the part to be cut of the upper electrode sheet 1 suddenly raises a temperature of the glass substrate 10, specifically, a part of the glass substrate 10 under the cutting lines 5 of the upper electrode sheet 1 to not lower than a softening temperature of glass (e.g., 696° C. for the soda-lime glass and 780° C. for the borosilicate glass), i.e., approximately several thousand ° C. whereat the glass is sublimated although it depends on an intensity of the laser light beam. The heated part is suddenly cooled instantaneously (e.g., on the order of milliseconds) to a room temperature by air or the like when the projection of the laser light beam 4 is completed. As a result, a surface part of each side end face of the glass substrate 10 is solidified earlier, thereby constituting the stable compressive stress layer 10a (referring to FIG. 8). In other words, the glass substrate 10 is turned partially to tempered glass with its impact strength improved to nearly 1.5–2 times.

A light source for the laser light beam 4 can be a carbonic acid laser, a YAG laser, or the like. The carbonic acid laser is most superior for improving the strength of glass.

The production method for the touch panel is not restricted to the above-described method wherein the transparent film 9 and the hard coat layer 12 are fused at four side end parts, that is, fused parts 14, and the surface layer part of each of the four side end faces of the glass substrate 10 becomes the compressive stress layer 10a.

For example, the upper electrode sheet 1 may be cut for every upper electrode 111 by projecting the laser light beam 4 from the side of the upper electrode sheet 1, and simultaneously with this, grooves 27 may be formed in the glass substrate 10 of the lower electrode sheet 2 under the upper electrode sheet for every lower electrode 21 by the laser light beam 4 (referring to FIG. 9). The glass substrate 10 may be finally divided along the grooves 27 at both of its faces, whereby individual touch panels 8 are obtained. If an output wattage of the laser is controlled or a diaphragm area of the focused lens projecting the laser light beam is changed, thereby controlling the intensity of the laser light beam, the strength of glass is improved furthermore in the embodiment of FIG. 9 different from the embodiment of FIG. 1 because the laser light beam 4 is projected to the glass substrate 10 as well. At this time, the groove 27 or 7 may be formed like a chain line, not necessarily a continuous line so long as the glass substrate 10.can be divided. The embodiment shown in FIG. 9 is different from the conventional method and eliminates microcracks at the grooves 27. In contrast to the conventional method whereby the cutter is used to cut the upper electrode sheet and form grooves in the glass substrate of the lower electrode sheet under the upper electrode sheet, according to the embodiment of FIG. 9, the upper electrode sheet 1 is cut and the grooves 27 are formed in the glass substrate 10 of the lower electrode sheet 2 with the use of the laser light beam 4 in place of the cutter, so that the glass substrate is cut sharp without microcracks being brought about at the grooves 27. It is sufficient for the depths of the grooves 27 formed in the glass substrate 10 of the lower electrode sheet 2 by the projection of the laser light beam 4 to be approximately 10% of a thickness of the glass substrate 10, preferably not larger than 10%.

Also, the glass substrate 10 can be sufficiently divided without being notched from the side of the lower electrode sheet 2 with the use of the cutter 6 (referring to FIG. 10) simply if the grooves 27 are formed in the glass substrate 10 by the projection of the laser light beam 4 to have a thickness, e.g., 10% or more of the thickness of the glass substrate 10 while controlling the output wattage of the laser or changing the diaphragm area of the lens emitting the laser light beam to thereby control the intensity of the laser light beam. When the grooves 27 are formed by the projection of the laser light beam 4 at a thickness of 10% or more of the thickness of the glass substrate 10, the glass substrate 10 can be divided with reliability. The groove 27 formed by the projection of the laser light beam 4 is preferably formed in a continuous line so as to surely divide the glass substrate 10. According to the embodiment of FIG. 10 in which the laser light beam 4 is projected from the side of the upper electrode sheet 1, thereby cutting the upper electrode sheet 1 for every upper electrode 111 and providing the grooves 27 for every lower electrode 121 in the glass substrate 10 of the lower electrode sheet 2 under the upper electrode sheet 1, alignment between the cutting lines 5 of the upper electrode sheet 1 and grooves of the glass substrate 10 of the lower electrode sheet 2 is eliminated.

A further arrangement is adoptable, wherein the upper electrode sheet 1 is cut for every upper electrode 111 by projecting the laser light beam 4 from the side of the upper electrode sheet 1 while controlling the output wattage of the laser or by changing the diaphragm area of the lens emitting the laser light beam to control the intensity of the laser light beam, and at the same time, the lower electrode sheet 2 below the upper electrode sheet 1 is completely cut by the laser light beam at cutting lines 28 for each lower electrode 121 (referring to FIG. 11), so that individual touch panels 8 are obtained. This embodiment in FIG. 11 eliminates even the work of separating the individual touch panels 8.

In the foregoing embodiments, the transparent conductive film 11a is formed for each upper electrode 111 based on a pattern, whereas each lower electrode 121 is a partial area necessary for input of the transparent conductive film 21a formed over all of the surface of the glass substrate 10. Reversely, the transparent conductive film 21a is formed for each lower electrode 121 based on a pattern whereas each upper electrode 111 may be a partial area necessary for input of the transparent conductive film 11a formed over all of the surface of the upper electrode sheet 1. Also, the transparent conductive films 11a, 21a may be formed for each upper electrode 111 and each lower electrode 121 based on respective patterns.

The adhesive sheet 3 by way of example of the adhesive layer in the above embodiments is a double-faced adhesive sheet with the rectangular openings 3a punched out. However, the adhesive layer is not limited to this. For instance, in the case where both the respective upper electrodes 111 and the respective lower electrodes 121 are provided with the transparent conductive films based on respective patterns, specifying the area necessary for input by the rectangular openings 3a becomes unnecessary and therefore band-shaped adhesive members formed separately without rectangular openings 3a and through-holes 3b may be set at peripheral edges of each high-strength touch panel to form the adhesive layer.

The upper electrode sheet 1 has the thickness of 75–300 $\mu$m and the lower electrode sheet 2 has the thickness of 0.55–2.5 mm, as one example in each of the embodiments.

The high-strength touch panel and its production method according to the present invention in the above-described constitution and operation exert the effects as follows.

Parts which constitute the four side end faces of the rectangular glass substrate of the touch panel due to the cutting or separation are suddenly raised to high temperatures at the projection of the laser light beam and suddenly instantaneously cooled to room temperatures at the completion of the projection of the laser light beam, and therefore the surface layer part thereof becomes the compressive stress layer. Each side end face of the glass substrate of the obtained touch panel is formed of tempered glass with superior strength.

A part to be cut of the upper electrode sheet is burnt off by the projection of the laser light beam. The transparent film and the hard coat layer on the transparent film are fused at the four cut end parts, thereby forming the fused parts. The hard coat layer of the obtained touch panel has superior adhesion accordingly.

In comparison with breadths of grooves cut by the cutter, the upper electrode sheet can be burnt off in a wider breadth by projecting the laser light beam in a wide breadth, or both the upper electrode sheet and the lower electrode sheet can be burnt off by the projection of the laser light beams. In the production process, the grooves of the glass substrate of the lower electrode sheet are formed along the wide breadth-cutting lines of the upper electrode sheet and within the breadth, consequently simplifying or eliminating alignment between the cutting lines of the upper electrode sheet and grooves of the glass substrate of the lower electrode sheet.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A resistance film type touch panel in which an upper electrode sheet (1) having upper electrodes (111) on one face of a flexible transparent film (9) and a hard coat layer (12) on an other face of the film, and a lower electrode sheet (2) having lower electrodes (121) confronting the upper electrodes on one face of a glass substrate (10) are disposed to face each other over a distance maintained by spacers (13) between the upper electrodes and the lower electrodes confronting the upper electrodes and respective peripheries of the upper electrodes and the lower electrodes confronting the upper electrodes are bonded by an adhesive layer (3), wherein the transparent film and the hard coat layer are fused at side end parts thereby forming fused parts (14), so that a surface layer part of each side end face of the glass substrate adjacent to the fused parts becomes a compressive stress layer (10a).

2. A method for producing resistance film type touch panels, whereby an upper electrode sheet (1) having a plurality of upper electrodes (111) on one face of a flexible transparent film (9) and a hard coat layer (12) on an other face of the film, and a lower electrode sheet (2) having a plurality of lower electrodes (121) confronting the plurality of upper electrodes on one face of a glass substrate (10) are disposed to face each other over a distance maintained by spacers (13) between the upper electrodes and the lower electrodes confronting the upper electrodes with respective peripheries of the upper electrodes and the lower electrodes confronting the upper electrodes being bonded by an adhesive layer (3), and then divided into individual touch panels, said method comprising:

bonding the upper electrode sheet having the plurality of upper electrodes and the lower electrode sheet having the plurality of lower electrodes by means of the adhesive layer;

thereafter projecting a laser light beam (4) from a side of the upper electrode sheet thereby cutting the upper electrode sheet for each of the upper electrodes, with notching from a side of the lower electrode sheet with use of a cutter (6) thereby forming first grooves (7) in the glass substrate of the lower electrode sheet; and thereafter dividing the glass substrate along the first grooves to obtain individual high-strength touch panels (8).

3. A method for producing resistance film type high-strength touch panels according to claim 2, which includes:

forming second grooves (27) in the glass substrate of the lower electrode sheet below the upper electrode sheet for every one of the lower electrodes simultaneously with the projection of the laser light beam when the upper electrode sheet is cut for each of the upper electrodes by the projection of the laser light beam from the side of the upper electrode sheet; and dividing the glass substrate along the first and second grooves at both faces of the glass substrate when the glass substrate is divided along the first grooves, thereby obtaining individual high-strength touch panels.

4. A method for producing resistance film type high-strength touch panels according to claim 3, wherein the transparent film and hard coat layer are fused at side end parts thereby forming fused parts (14) at the projection of the laser light beam (4), so that a surface layer part of each side end face of the glass substrate adjacent to the fused parts becomes a compressive stress layer (10a).

5. A method for producing resistance film type high-strength touch panels according to claim 2, wherein the transparent film and hard coat layer are fused at side end parts thereby forming fused parts (14) at the projection of the laser light beam (4), so that a surface layer part of each side end face of the glass substrate adjacent to the fused parts becomes a compressive stress layer (10a).

6. A method for producing resistance film type touch panels, whereby an upper electrode sheet (1) having a plurality of upper electrodes (111) on one face of a flexible transparent film (9) and a hard coat layer (12) on an other face of the film, and a lower electrode sheet (2) having a plurality of lower electrodes (121) confronting the plurality of upper electrodes on one face of a glass substrate (10) are disposed to face each other over a distance maintained by spacers (13) between the upper electrodes and the lower electrodes confronting the upper electrodes with respective peripheries of the upper electrodes and the lower electrodes confronting the upper electrodes being bonded by an adhesive layer (3), and then divided into individual touch panels, said method comprising:

bonding the upper electrode sheet having the plurality of upper electrodes and the lower electrode sheet having the plurality of lower electrodes by means of the adhesive layer;

thereafter projecting a laser light beam (4) from a side of the upper electrode sheet thereby cutting the upper electrode sheet for each of the upper electrodes and also forming grooves (27) in the glass substrate of the lower electrode sheet for each of the lower electrodes; and thereafter dividing the glass substrate along the grooves into each of the electrodes to obtain individual high-strength touch panels (8).

7. A method for producing resistance film type high-strength touch panels according to claim 6, wherein the transparent film and hard coat layer are fused at side end parts thereby forming fused parts (14) at the projection of the laser light beam (4), so that a surface layer part of each side end face of the glass substrate adjacent to the fused parts becomes a compressive stress layer (10a).

8. A method for producing resistance film type touch panels, whereby an upper electrode sheet (1) having a plurality of upper electrodes (111) on one face of a flexible transparent film (9) and a hard coat layer (12) on an other face of the film, and a lower electrode sheet (2) having a plurality of lower electrodes (121) confronting the plurality of upper electrodes on one face of a glass substrate (10) are disposed to face each other over a distance maintained by spacers (13) between the upper electrodes and the lower electrodes confronting the upper electrodes with respective peripheries of the upper electrodes and the lower electrodes confronting the upper electrodes being bonded by an adhesive layer (3), and then divided into individual touch panels, said method comprising:

bonding the upper electrode sheet having the plurality of upper electrodes and the lower electrode sheet having the plurality of lower electrodes by means of the adhesive layer; and thereafter projecting a laser light beam (4) from a side of the upper electrode sheet thereby cutting the upper electrode sheet for each of the upper electrodes and also cutting the lower electrode sheet below the upper electrode sheet for each of the lower electrodes thereby obtaining individual high-strength touch panels (8).

9. A method for producing resistance film type high-strength touch panels according to claim 5, wherein the transparent film and hard coat layer are fused at side end parts thereby forming fused parts (14) at the projection of the laser light beam (4), so that a surface layer part of each side end face of the glass substrate adjacent to the fused parts becomes a compressive stress layer (10a).

* * * * *